US009149970B2

(12) United States Patent
Martini et al.

(10) Patent No.: US 9,149,970 B2
(45) Date of Patent: Oct. 6, 2015

(54) BLOW MOULDING MACHINE WITH FEED LINE STERILIZATION

(75) Inventors: Oliver Martini, Konolfingen (CH); Juergen Soellner, Beratzhausen (DE); Michael Dahmen, Hamburg (DE); Josef Hausladen, Woerth/Donau (DE); Ulrich Lappe, Regensburg (DE); Klaus Voth, Obertraubling (DE)

(73) Assignee: KRONES AG (DE)

( * ) Notice: Subject to any disclaimer, the term of this patent is extended or adjusted under 35 U.S.C. 154(b) by 395 days.

(21) Appl. No.: 13/112,764

(22) Filed: May 20, 2011

(65) Prior Publication Data
US 2011/0309557 A1    Dec. 22, 2011

(30) Foreign Application Priority Data

May 20, 2010 (DE) .......................... 10 2010 022 132

(51) Int. Cl.
| B29C 49/46 | (2006.01) |
| B29C 49/42 | (2006.01) |
| B29C 49/06 | (2006.01) |
| B29C 49/12 | (2006.01) |

(52) U.S. Cl.
CPC .............. *B29C 49/42* (2013.01); *B29C 49/4252* (2013.01); *B29C 49/4284* (2013.01); *B29C 49/06* (2013.01); *B29C 49/12* (2013.01)

(58) Field of Classification Search
CPC ............... B29C 2049/4635; B29C 2049/4679; B29C 49/46; B29C 2049/4694
USPC ..................... 425/530, 535; 264/39
See application file for complete search history.

(56) References Cited

U.S. PATENT DOCUMENTS

| 3,650,678 | A | * | 3/1972 | Hansen ......................... 425/317 |
| 3,712,784 | A | * | 1/1973 | Siard et al. ..................... 425/526 |
| 4,208,852 | A | * | 6/1980 | Pioch .............................. 53/167 |
| 4,488,863 | A | * | 12/1984 | Collette ......................... 425/530 |
| 4,623,516 | A | * | 11/1986 | Weiler et al. .................... 422/28 |
| 4,880,581 | A | * | 11/1989 | Dastoli et al. .................. 264/39 |

(Continued)

FOREIGN PATENT DOCUMENTS

| CN | 101460389 A | 6/2009 |
| DE | 195 20 925 A1 | 12/1996 |

(Continued)

OTHER PUBLICATIONS

Partial machine translation of JP 2000-167915 a dated Jun. 2000 obtained from the JPO website.*

(Continued)

*Primary Examiner* — Robert B Davis

(57) ABSTRACT

An apparatus for shaping plastics material pre-forms to form plastics material containers may include a conveying device which conveys the containers along a pre-set conveying path, a stressing device which acts upon the containers with a flowable medium in order to expand them, a reservoir for storing the flowable medium, and a supply device which delivers the flowable medium from the reservoir to the container. A valve device controls the supply of the flowable medium into the containers, in order to expand the containers. The apparatus includes a first feed line in order to supply a flowable sterilization medium to the supply line between the reservoir and the container to be treated or in a removal line for the flowable medium, which removes the flowable medium from the containers.

19 Claims, 3 Drawing Sheets

(56) References Cited

U.S. PATENT DOCUMENTS

| | | | |
|---|---|---|---|
| 4,989,649 A * | 2/1991 | Weiler et al. | 141/1 |
| 5,975,880 A * | 11/1999 | Takada et al. | 425/526 |
| 6,214,282 B1 | 4/2001 | Katou et al. | |
| 2001/0043960 A1* | 11/2001 | Castellari | 425/150 |
| 2008/0029928 A1* | 2/2008 | Andison et al. | 264/238 |
| 2008/0152538 A1 | 6/2008 | Quetel et al. | |
| 2010/0199604 A1 | 8/2010 | Fischer | |

FOREIGN PATENT DOCUMENTS

| | | |
|---|---|---|
| DE | 10 2006 053 193 A1 | 5/2008 |
| FR | 1430316 A | 3/1966 |
| GB | 1340677 A * | 12/1973 |
| JP | 2000-167915 A | 6/2000 |
| WO | WO 0242055 A1 * | 5/2002 |
| WO | 2009/075791 A1 | 6/2009 |
| WO | 2010/003873 A1 | 1/2010 |
| WO | 2010/020529 A2 | 2/2010 |

OTHER PUBLICATIONS

German Search Report for DE 10 2010 022 132.5, mailed Apr. 12, 2011.

Extended European Search Report dated Apr. 8, 2014, issued in corresponding European Application No. 11166831.5.

Chinese Office Action dated Jun. 3, 2013, issued in corresponding Chinese Application No. 201110131843.1.

* cited by examiner

BLOW MOULDING MACHINE WITH FEED LINE STERILIZATION

CROSS-REFERENCE TO RELATED APPLICATION

This application claims the benefit of priority of German Patent Application No. 10 2010 022 132.5, filed May 20, 2010, pursuant to 35 U.S.C. 119(a)-(d), the disclosure of which is incorporated herein by reference.

TECHNICAL FIELD

The present disclosure relates to an apparatus and a method of shaping plastics material pre-forms to form plastics material containers.

BACKGROUND

Apparatuses and methods of this type have long been known in the form of blow moulding machines in the prior art. In this case plastics material pre-forms are heated to a deformation temperature and are shaped by means of compressed air to form plastics material containers. The compressed air required for this purpose is supplied to a plurality of blowing stations by way of an annular duct for example.

It is also known from the prior art to carry out aseptic shaping processes. In this case containers, closures and surfaces are sterilized in a temporary or continuous manner for example by means of gaseous hydrogen peroxide ($H_2O_2$). After that, in cold aseptic filling plants for example a sterile product can be filled into previously sterilized containers and the containers can be closed with a sterile closure. In this case the sterilization of the packing materials and the filling of the product are usually carried out in a machine unit. The entire room in which the sterilization and optionally also the filling take place is referred to as an isolator or clean room. Whilst the packing material is continuously sterilized in the production cycle, this isolator or clean room likewise has to be sterilized at the beginning of the production. Hitherto a surface sterilization was carried out in the isolator by liquid agents, in which case it was preferable for a peracetic acid solution to be used.

This was applied at a defined concentration and was allowed to act for a specified period of time (also referred to as the contact time). After that the solution is rinsed with sterile water.

Starting from this prior art, it may be desirable to increase the degree of sterilization or purity of the machines.

SUMMARY

According to various aspects of the disclosure, an apparatus for shaping plastics material pre-forms to form plastics material containers has a conveying device which conveys the containers along a pre-set conveying path. Furthermore, the apparatus has a stressing device which acts upon the containers with a flowable medium in order to expand them. In addition, a reservoir for storing the flowable medium is also provided, as well as a supply device which delivers the flowable medium from the reservoir to the container. In this case this valve device controls the supply of the flowable medium into the containers.

According to the disclosure the apparatus has a first feed line in order to supply a flowable sterilization medium to the supply line (between the reservoir and the container to be treated) or a removal line for the flowable medium, which removes the flowable medium from the containers.

In conjunction with the present description a valve device is to be understood as being only not those devices which only permit or completely prevent a supply of the medium but also those devices which permit a regulation of a flow of the medium such as for example pressure regulators, pressure reducers and the like. In this way, the valve device in the wider sense is a supply control device which controls the supply of the gaseous medium to the containers. In the following the term "pressure reducer" is used as well as the term "valve device".

In the context of the development work of the Applicants it has been recognized that it is also useful to sterilize the inner surfaces of pipeline systems and also filters and/or containers present in pipeline systems. Accordingly, it would also be possible for the feed line to lead into a removal line which removes the flowable medium from the blowing stations (for example for the purpose of recycling air). In this case the sterilization medium is conveyed in the opposite direction to the flowable medium through the apparatus in working operation. It may be advantageous in some aspects, however, for the flowable medium and the sterilization medium to be conveyed through the apparatus in the same conveying direction.

It may be preferable in some aspects for the apparatus to have a clean room inside which the containers are conveyed. In this case for example an apparatus can be provided as is described in WO 2010/020 529 A2. The subject matter of this disclosure is hereby made by reference into the subject matter also of the present disclosure in its entirety.

The (gas) stressing device is in particular a blowing nozzle which is optionally designed jointly with a blowing piston and which is placed on the openings of the containers or even on the blow mould, in order to act upon the containers with compressed air. In this way, the flowable medium is in particular a gas and, in some particularly preferred aspects, compressed air. The stressing device may be advantageously movable with respect to the container in some aspects.

A reservoir for storing the flowable medium is understood as being any device which can make the medium available, such as for example a container, an annular duct or even a compressor, which is capable of making the air available at a pre-set pressure.

According to the disclosure it is proposed that the supply line or the supply lines should be sterilized. It may be advantageous in some aspects for the sterilization medium to be a gaseous sterilization medium. In this way, for example, hydrogen peroxide ($H_2O_2$) could be used to sterilize the aforesaid lines. It may be advantageous in some aspects for the reservoir to be arranged in a stationary manner. In other words, the container and preferably in some aspects also the valve device, are guided so as to be movable with respect to the reservoir. In this way, for example the apparatus can have a blowing wheel on which a plurality of blowing stations are arranged which are conveyed in this case along a circular path.

It may be advantageous in some aspects for the apparatus to have a plurality of blow moulds in which the plastics material pre-forms are capable of being shaped to form plastics material containers by being acted upon with the flowable medium.

In the case of a further exemplary embodiment the apparatus can have a sterile air filter which may be advantageously arranged in the aforesaid supply line in some aspects. In the case of a further exemplary embodiment, the apparatus has a control device which allows the sterilization medium to be supplied only outside a working operation of the apparatus, during which the containers are acted upon with flowable medium. This embodiment ensures that sterilization is carried out not during a working operation of the apparatus but for example before the working operation or even in pauses in the operation and the like.

In the case of a further exemplary embodiment the apparatus has a plurality of stressing devices or blowing nozzles. In addition, the apparatus has a distributor device which conveys the flowable medium to the individual stressing devices, in which case the feed line preferably opens, in some aspects, into the supply line between the reservoir and the distributor device. It may be advantageous in some aspects for the distributor device to convey the flowable medium from stationary elements of the apparatus to movable elements of the apparatus.

The distributor device can be for example a so-called rotary distributor which distributes the compressed air to individual annular ducts, these annular ducts then preferably being rotatable with the blowing stations in some aspects. It may be advantageous in some aspects for a plurality of annular ducts of this type to be provided which are used for supplying the individual blowing stations in different pressure stages.

It may be advantageous in some aspects for the apparatus to have a second feed line for a further sterilization medium. In this way, the apparatus can be acted upon with a plurality of sterilization media.

In this way, it is possible for example for the gaseous sterilization agent to be added at a central feed point at a specified moment in time in the production cycle, for example during the production preparation at specified feed points. Feed points into the system could in some cases be feed lines for supplying compressed air to the blow moulding machine. The method is in some aspects used at a time in which a container is not blow moulded.

This disclosure may be advantageous in some aspects particularly if a sterilization preparation is provided at the corresponding type of plant. In particular, in the case of pipeline systems or containers which have to be sterilized before the beginning of production or have to be re-sterilized during continuous production but which are temperature-resistant to only a limited degree, it is preferable in some aspects to use this method or this apparatus. In this way, as mentioned above, the method can be used for example in a rotary distributor for media in a blow moulding machine.

In the case of a further exemplary embodiment the feed of the sterilization medium into the supply line takes place in a region of the supply line which is situated downstream of the valve devices. In this way it is made possible for the valve devices or pressure regulation devices themselves not to have the sterilization medium flow through them even during the sterilization procedure. In addition, the valve device could be situated between a supply point for a first sterilization medium and a supply point for a second sterilization medium.

The present disclosure further relates to a method of operating an apparatus for shaping plastics material pre-forms to form plastics material containers, in which in a working operation the apparatus acts upon containers with a liquid medium by means of a plurality of stressing devices and this flowable medium is supplied to the containers by way of a supply line.

According to the disclosure a gaseous sterilization medium is supplied to the supply line at least for a time in order to sterilize the supply line. In this case this sterilization medium can be supplied directly to the supply line or it can also be introduced into different regions of the apparatus, in order to arrive in the supply device or the supply line from there. In this way, the sterilization medium could also be supplied by way of the blowing nozzle.

In this way, it is also proposed with respect to the method that a sterilization of the supply lines should be carried out. It is preferable in some aspects for the sterilization medium to be supplied to the supply line in a cleaning mode of the plant.

First of all, in this way, in an exemplary method, air, for example, heated compressed air, could first of all be discharged by way of a feed point, in particular a central feed point, in order to remove remaining liquid which is possibly present in the system and which delays the achievement of the sterilization, and/or in order to condition the system. This process can advantageously be monitored by means of temperature sensors or moisture sensors in some aspects.

After a specified drying or conditioning time the gaseous sterilization agent can be added—preferably in some aspects at the same feed point. Condensation of the sterilization gas is to be prevented by the choice of suitable process parameters. The sterilization gas can be fed into a clean room with at least one suction point during the sterilization cycle for example by way of a nozzle arrangement.

It may be advantageous in some aspects for this clean room to be sterilized at the same time by the medium or by the same medium by way of a further supply means. This supply means is for example a further pipeline system which advantageously has a filtration device in some aspects.

It may be advantageous in some aspects for the sterilization medium to contain hydrogen peroxide. It may be advantageous in some aspects, as mentioned above, for the sterilization to be carried out outside a working operation of the apparatus.

In the case of a further exemplary method a further medium is supplied to the apparatus and, in particular, the supply line after the sterilization. This further medium is, in particular, a sterile gas and, in some particularly preferred aspects, sterile air. In this way the respective supply lines can again be freely rinsed again by the sterilization gas. The sterile air can be prepared by way of special sterile filtration devices. In some aspects, these are preferably sterilized with steam or a gaseous sterilization agent before use.

In the case of a further exemplary method, as mentioned above, compressed air is supplied to the apparatus before the sterilization.

Further exemplary embodiments and advantages may be evident from the accompanying drawings.

DETAILED DESCRIPTION

Figure 1A:
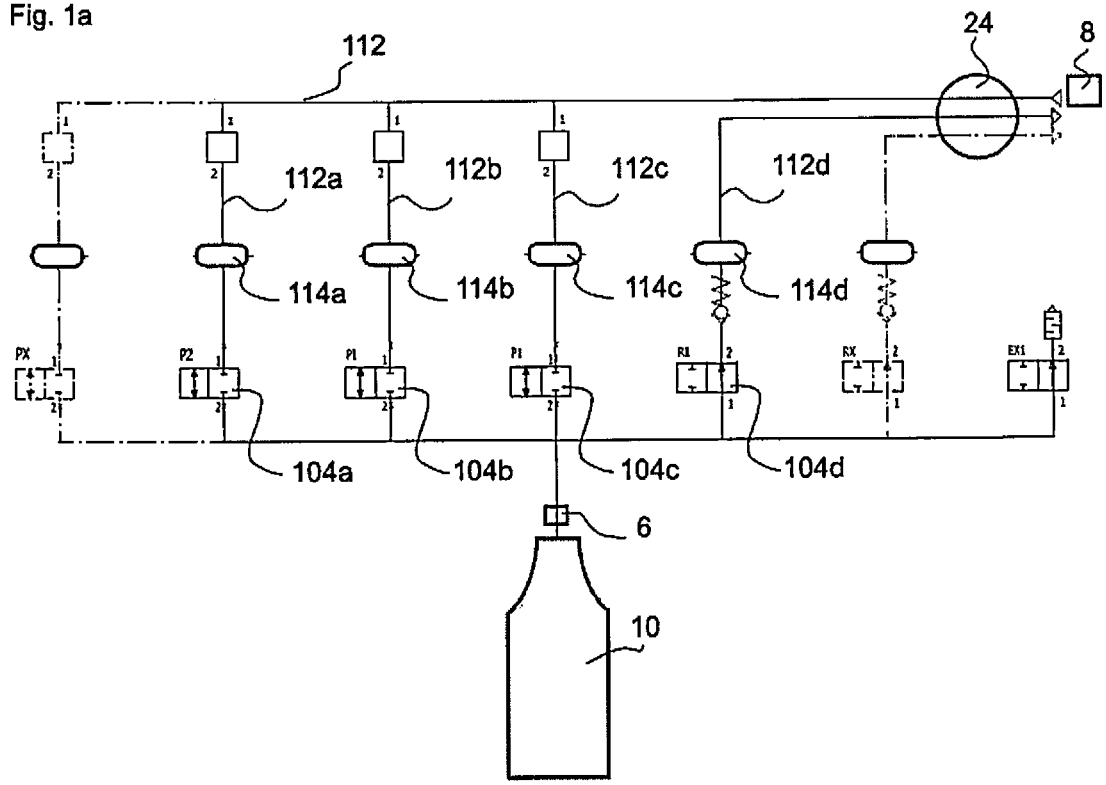
FIG. 1a is a diagrammatic illustration of the patterns of the medium in the prior art.

FIG. 1a is an illustration of the individual patterns of the medium in the prior art. In this case the gaseous medium, for example compressed air, is made available from a reservoir 8, such as for example a compressor. After that, the medium is distributed to a plurality of partial ducts 112a to 112c by way of a distributor, such as for example a rotary distributor 24 by way of a main duct 112. The medium passes from these partial ducts 112a to 112c into annular ducts 114a to 114c in each case. These annular ducts too constitute a component part of the supply line for the compressed air.

The supply of the compressed air by way of a blowing nozzle 6 into the container 10 is controlled by way of valves 104a to 104c. In addition, as shown in FIG. 1, further annular ducts as well as lateral arms could also be provided for the compressed air supply. The line 112d is a return line, by way of which compressed air can be returned to the reservoir again by way of the distribution device 24. In this case this return line is used for energy saving, since for example compressed air can be recycled. It is preferable in some aspects for a plurality of blowing stations to be supplied from each of the annular ducts.

Figure 1B:
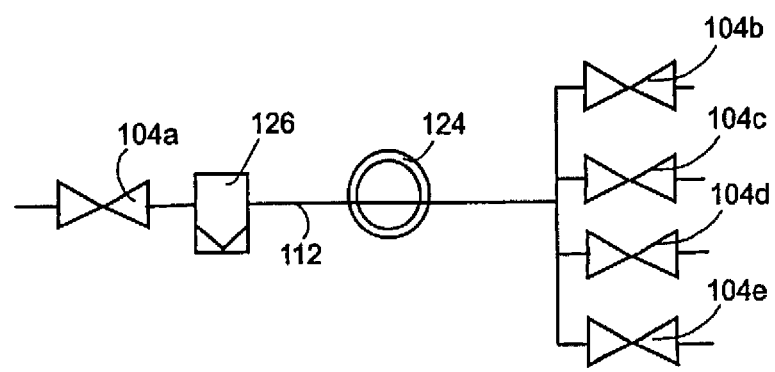
FIG. 1b is a further illustration of the patterns of the medium in the prior art.

FIG. 1b is a further illustration of an apparatus according to the prior art. In this case a pressure reducer (or pressure regulation device) 104a is provided in the main line 112, as well as four further pressure reducers 104b to 104e which are arranged in the individual lateral ducts. The reference number 126 relates to a filter device for filtering the compressed air.

Figure 2:
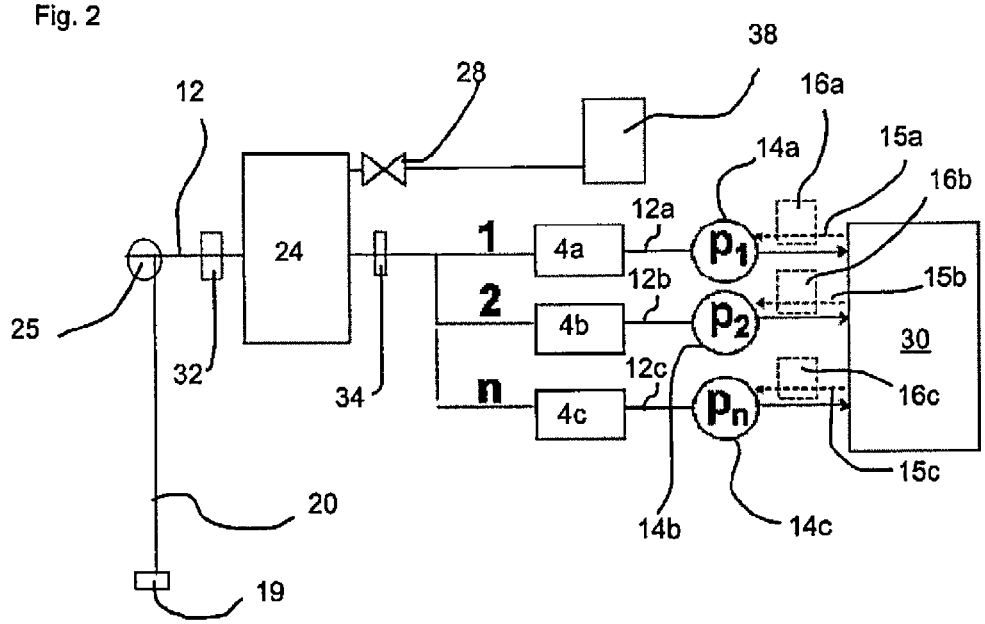
FIG. 2 is an illustration of the patterns of the medium in the case of an apparatus according to the disclosure.

FIG. 2 is an illustration of an apparatus according to the disclosure. In this case, too, a supply line 12 is provided which opens into lateral lines 12a to 12c, as well as annular ducts 14a to 14c, which are likewise, however, a component part of the supply line 12. The compressed air from these individual annular ducts 14 to 14c is eventually supplied to a blowing station 30 or a blowing nozzle. In addition, return lines 15a to 15c can also be provided. In this case the individual ducts 14a to 14d are used for making available different pressure levels. The references 4a to 4c relate to pressure reducers which can be fitted in the respective partial ducts 14a to 14c. In this case these pressure reducers represent the valve devices which are mentioned in the introduction and which control the supply of the gaseous medium into the containers. In addition, a distributor device or a rotary distributor 24 is provided which apportions the air from the reservoir arranged in a stationary manner to the rotating blowing stations. A first filter 32 is arranged upstream of this distributor device 24 and a second filter 34 is arranged downstream of the distributor device. In addition, an air consumer device 38 can be provided which in this case has no direct contact with the product or packed material, as well as a shut-off apparatus such as a valve 28 which controls the supply of the compressed air into this air consumer device 38. The reference number 19 designates a reservoir for the sterilization medium.

It is now proposed that a sterilization medium, and preferably in some aspects a gaseous sterilization medium, should be supplied by way of a feed line 20 and a central feed point in particular in a sterilization operation in order to sterilize or to clean the supply line 12 or the individual partial lines 12a to 12c and/or the annular ducts 14a to 14c in this way. The references 16a to 16c relate to filter units for dealing with the waste air from the individual blowing stations.

It is preferable in some aspects for the blow moulding machine according to the disclosure to be a blow moulding machine operated in a sterile manner, i.e. the individual blowing stations 30 are advantageously, in some aspects, conveyed through a sterile room and the containers are produced in particular inside this sterile room. In addition, a heating device for heating the plastics material pre-forms can be provided upstream of the blow moulding machine. The containers can also be conveyed through a sterile room in this heating device.

In this context the Applicants have also recognized the necessity of regularly sterilizing and keeping sterile the lines and paths of the highly compressed air which is used for blow moulding the containers. In addition, the sterility of the highly compressed air itself is also advantageously provided in some aspects, for example, by way of filtration.

It may be advantageous in some aspects for the further development of the sterilization of the pre-forms for the sterility of the pre-forms or bottles also to be maintained during the stretch blow moulding process. It may be advantageous in some aspects for the apparatus to be a so-called stretch blow moulding machine which also has a stretch rod which extends the containers in the longitudinal direction thereof.

The present disclosure is therefore suitable, in particular, for plants which fill containers in an aseptic manner, the plastics material pre-forms being filled in an aseptic manner after a preceding sterilization and a sterile shaping of the plastics material pre-forms by a stretch blow moulding process or by comparable processes. In addition, it would also be possible for already sterile plastics material pre-forms also to be supplied to the blow moulding process even without a previous sterilization.

It is therefore also made possible by the apparatus according to the disclosure and the method according to the disclosure for the medium of highly compressed air for shaping the sterile plastics material pre-forms to be made available in a sterile manner in the working operation, in order to prevent a microbiological recontamination during the stretch blow moulding process in this way.

With reference to FIG. 2 the filter devices 32 and 34 are also cleaned regularly. It may be advantageous in some aspects, however, for the sterilization described here to be carried out outside a working operation of the plant. This sterilization of the filters or sterile air filters can be carried out for example by means of steam or chemical sterilization media such as for example gaseous hydrogen peroxide, liquid peracetic acid or even other oxidizing media.

In addition, as mentioned in the introduction, the paths conveying compressed air, i.e. in particular in this case the supply lines 12, as well as 12a to 12d, are also regularly sterilized. Ideally, the sterilization by means of gaseous hydrogen peroxide, which is supplied by way of the feed line 20, also takes place here. Other sterilization media, such as steam, liquid peracetic acid or other oxidizing media are likewise possible. It may be advantageous in some aspects for the individual compressed air paths to be designed in such a way that an adequate sterilization is provided and re-contamination during the operation according to the intended use is eliminated.

As is evident from FIG. 2, in the case of modern stretch blow moulding processes different pressure levels are required for an efficient production of the plastics material bottles. In this case, in accordance with the present day prior art the compressed air required for this is supplied at a pre-set pressure level by way of a distributor device such as the pressure distributor 24 to the rotating part of the blow moulding machine with the blowing stations 30 and only downstream of the pressure distributor 24 is the pressure reduced to the different pressure levels by means of pressure reducers 4a to 4c. Since these pressure reducers 4a to 4c are also not hygienic or aseptic components in the true sense, it is proposed according to the disclosure in this case that the different pressure levels required should be produced under sterile conditions.

Not shown in the figures is a conveying device which conveys the blowing stations or the containers 10. In this case it is possible, as is known per se in the prior art, for the individual blowing stations to be arranged on a blowing wheel and to be conveyed accordingly along a circular path. In addition, the containers are preferably conveyed in some aspects, as mentioned, inside a clean room or sterile room during the expansion procedure.

Figure 3:
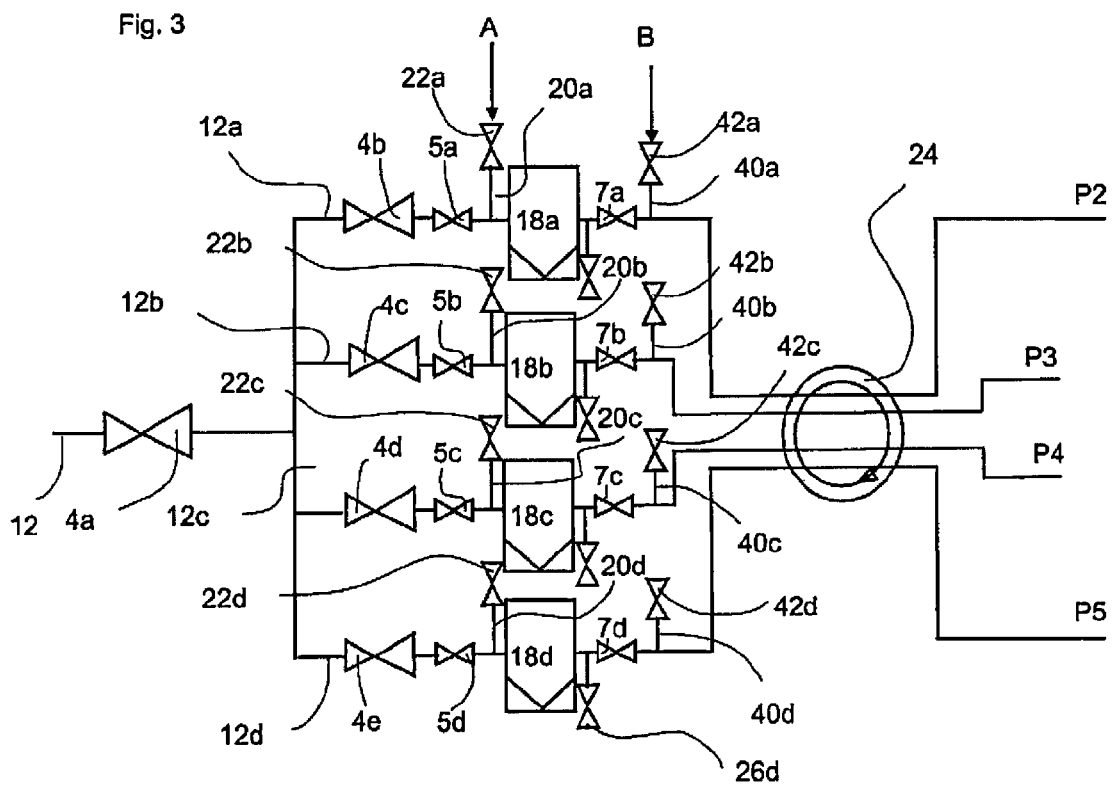
FIG. 3 shows a further embodiment of the apparatus according to the disclosure.

FIG. 3 shows a further embodiment of the present disclosure. In this case the individual pressure reducers or pressure regulators (which also again constitute the valve devices mentioned in the introduction) 4a to 4e are arranged upstream of the distributor device 24 and also the individual filter devices 18a to 18d. The feed lines 20a to 20e for the sterilization medium A are arranged in this case downstream of the pressure reducers or pressure regulators 4a to 4e, but upstream of the filter devices. The references 22a to 22d designate valve devices which control the supply of the sterile medium A.

The references 5a to 5d relate to valves which are arranged downstream of the pressure reducers 4b to 4e. These valves could also, however, be arranged upstream of the pressure reducers. The references 7a to 7d relate to further valves which in this case are arranged downstream of the filter devices 18a to 18d.

In this case the different pressure levels are produced upstream of the rotary distributor 24 in this way and after the sterile filtration of the compressed air of each individual pressure level has been carried out they are supplied by way of a plurality of tracks in the rotary distributor 24 to the individual blowing stations (not shown). The references 22a to 22e relate to valves by way of which the supply of the sterilization medium to the individual supply lines 12a to 12d can be controlled.

The references 40a to 40d [relate] to further feed lines by which a second sterilization medium B can be supplied to supply lines 12a to 12d. In a corresponding manner, in the case too the references 42a to 42d in turn designate valves which control the supply of the sterile medium B to the plant. The sterilization medium A can be removed by way of valves 26a to 26d (for improved visualization only the valve 26d is indicated) if it is used only for the sterilization of the filters 18a to 18d.

Figure 4:
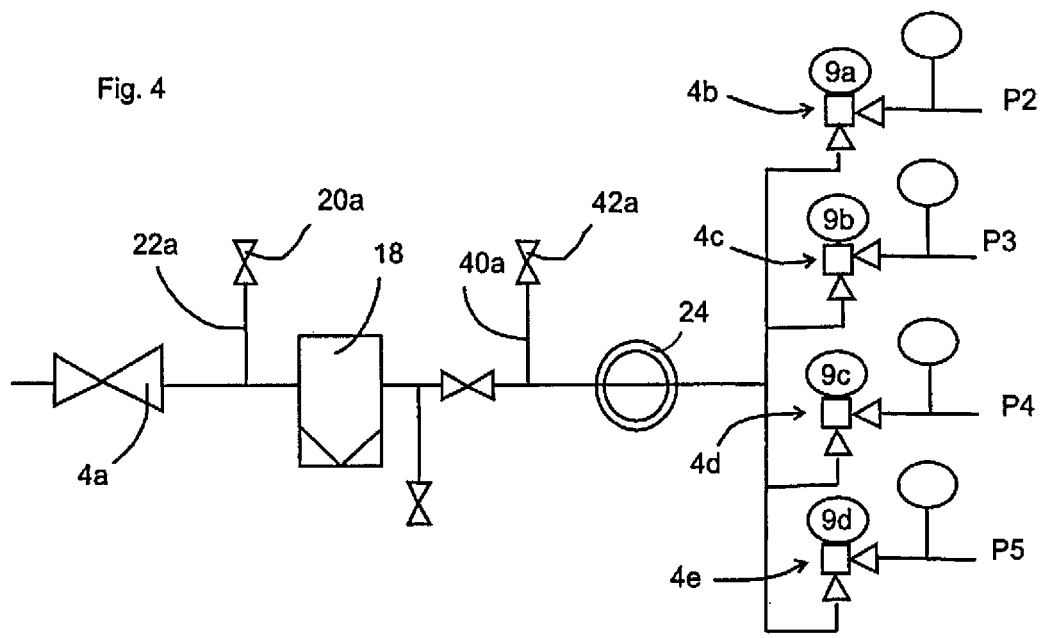
FIG. 4 shows a further embodiment of the apparatus according to the disclosure.

FIG. 4 shows a further arrangement in an apparatus according to the disclosure. Here too a valve device 4a is arranged upstream and a first sterile medium A is supplied by way of a feed line 20a and a valve 22a. In this case this sterile medium is also used for the sterilization of the filter device 18. In addition, the second feed line 40a is also present and is followed by the distributor device 24 which is designed in the manner of a single duct in this case.

Following the distributor device individual regulating valves 4b to 4e are provided which control the pressure of the individual pressure stages P2 to P5. Here these regulating valves take on the function of the valve devices mentioned in the introduction. In this case the pressure is monitored and regulated by way of a measuring instrument 9a to 9d. In this way, the sterile compressed air is made available at a pressure level to the rotating part of the machine in this case too. Pressure-regulating valves, which are compliant with hygiene requirements and which have no effect upon the sterility, can be used for example. In addition, the supply lines can have provided in them temperature-measuring instruments or even measuring instruments which determine other physical parameters such as for example contents of liquids.

Figure 5:
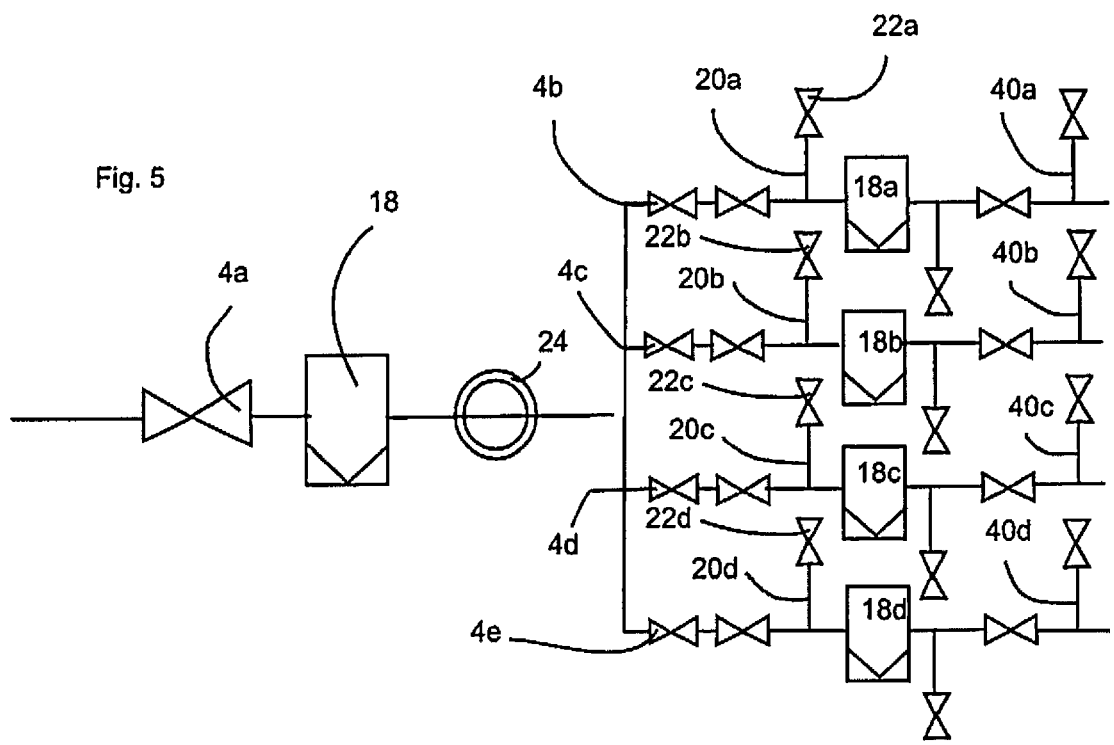
FIG. 5 shows a further embodiment of the apparatus according to the disclosure.

FIG. 5 illustrates a further arrangement of the present disclosure. In the case of this arrangement the compressed air is first supplied non-sterile by way of the rotary distributor 24 and is filtered in a sterile manner or is treated in a sterile manner on the rotating part only after the different pressure levels have been set. In this case, however, a plurality of feed lines 20a to 20d are provided which in each case introduce a sterilization medium A upstream of the individual filter devices 18a to 18d. Here too it is also possible for second feed lines 40a to 40d to be provided which can supply a second sterile medium.

It is preferable in some aspects for materials, which have a high degree of resistance to the sterilization medium used, such as for example hydrogen peroxide and/or steam, to be selected for the individual supply lines.

In this way, it is possible as a whole to prevent the recontamination of sterile plastics material pre forms during the shaping and thus also to achieve a significant reduction in the costs as compared with sterilization of the ready-shaped containers for aseptic filling.

As a result of the procedure according to the disclosure it is also possible for temperature-sensitive components to be sterilized, in which case an integration is possible with little outlay into a central evaporator supply and sterile air supply, in particular into machines with dry sterilization processes. In addition, it would also be possible for the feed line or feed lines for the sterilization medium to be installed subsequently on already existing plants.

As mentioned, the apparatus according to the disclosure is in particular such a device as can sterilize the plastics material pre-forms under sterile conditions to form plastics material containers. In this way, the individual supply lines are used not only for conveying the blowing air, but also for conveying a sterilization medium.

It will be apparent to those skilled in the art that various modifications and variations can be made to the blow moulding machine with feed line sterilization of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. An apparatus for shaping plastics material pre-forms to form plastics material containers, comprising:
    a conveying device which conveys containers along a preset conveying path;
    a stressing device which acts upon the containers with a flowable medium in order to expand them;
    a reservoir for storing the flowable medium;
    a supply line which delivers the flowable medium from the reservoir to the container;
    a valve device configured to control the supply of the flowable medium into the containers, in order to expand the containers; and
    a first feed line configured to supply a flowable sterilization medium to the supply line between the reservoir and the container to be treated or in a removal line for the flowable medium, which removes the flowable medium from the containers,
    wherein the sterilization medium is conveyed in the opposite direction to the flowable medium or flowable medium and the sterilization medium are conveyed through the apparatus in the same conveying direction via a control device which allows the sterilization medium to be supplied only outside a working operation of the apparatus, during which the containers are acted upon with the flowable medium, and wherein the sterilization medium is an oxidizing medium, or the sterilization medium is hot steam that applies thermal sterilization.

2. An apparatus according to claim 1, wherein the stressing device comprises a gas stressing device.

3. An apparatus according to claim 1, wherein the reservoir is arranged in a stationary manner.

4. An apparatus according to claim 1, further comprising a plurality of blowing stations in which plastics material pre-forms are capable of being shaped to form plastics material containers.

5. An apparatus according to claim 1, further comprising: at least one additional stressing device; and a distributor device which conveys the flowable medium to the stressing device and the at least one additional stressing device, wherein the feed line advantageously opens into the supply line between the reservoir and the distributor device.

6. An apparatus according to claim 1, further comprising a second feed line for a further sterilization medium.

7. An apparatus according to claim 1, wherein the feed of the sterilization medium into the supply line takes place in a region of the supply line which is situated downstream of the valve devices.

8. A method of operating the apparatus for shaping plastics material pre-forms to form plastics material containers according to claim 1, the method comprising:
supplying a flowable medium to at least one container by way of a supply line; in a working operation, acting upon said at least one container via the apparatus with a flowable medium by means of a plurality of stressing devices; and
supplying a sterilization medium to the supply line at least for a time in order to sterilize the supply line, wherein the sterilization medium is conveyed in the opposite direction to the flowable medium or flowable medium and the sterilization medium are conveyed through the apparatus in the same conveying direction, and wherein the sterilization medium is an oxidizing medium.

9. A method according to claim 8, wherein said sterilization medium comprises a gaseous sterilization medium.

10. A method according to claim 8, wherein the sterilization medium contains hydrogen peroxide.

11. A method according to claim 8, wherein a further sterile gas is supplied to the apparatus after the sterilization medium.

12. A method according to claim 8, wherein compressed air is supplied to the apparatus before the sterilization medium.

13. A method of operating an apparatus for shaping plastics material pre-forms to form plastics material containers, the method comprising:
providing an apparatus for shaping plastics material pre-forms to form plastics material containers including
a conveying device which conveys containers along a pre-set conveying path,
a stressing device which acts upon the containers with a flowable medium in order to expand them,
a reservoir for storing the flowable medium,
a supply line which delivers the flowable medium from the reservoir to the container,
a valve device configured to control the supply of the flowable medium into the containers, in order to expand the containers, and
a first feed line configured to supply a flowable sterilization medium to the supply line between the reservoir and the container to be treated or in a removal line for the flowable medium, which removes the flowable medium from the containers; supplying a flowable medium to at least one container by way of a supply line;
in a working operation, acting upon said at least one container via the apparatus with a flowable medium by means of a plurality of stressing devices; and
supplying a sterilization medium to the supply line at least for a time in order to sterilize the supply line, wherein the sterilization medium is conveyed in the opposite direction to the flowable medium or flowable medium and the sterilization medium are conveyed through the apparatus in the same conveying direction, wherein the sterilization medium is an oxidizing medium, or wherein the sterilization medium is hot steam that applies thermal sterilization.

14. A method according to claim 13, wherein said sterilization medium comprises a gaseous sterilization medium.

15. A method according to claim 13, wherein the sterilization medium contains hydrogen peroxide.

16. A method according to claim 13, wherein a further sterile gas is supplied to the apparatus after the sterilization medium.

17. A method according to claim 13, wherein compressed air is supplied to the apparatus before the sterilization medium.

18. An apparatus for shaping plastics material pre-forms to form plastics material containers, comprising:
a conveying device which conveys containers along a pre-set conveying path;
a stressing device which acts upon the containers with a flowable medium in order to expand them;
a reservoir for storing the flowable medium;
a supply line which delivers the flowable medium from the reservoir to the container;
a valve device configured to control the supply of the flowable medium into the containers, in order to expand the containers;
a first feed line configured to supply a flowable sterilization medium to
the supply line between the reservoir and the container to be treated or
in a removal line for the flowable medium, which removes the flowable medium from the containers,
wherein the sterilization medium is conveyed in the opposite direction to the flowable medium or flowable medium and the sterilization medium are conveyed through the apparatus in the same conveying direction, wherein the sterilization medium comprises hot steam to apply thermal sterilization; and
a second feed line for a further sterilization medium.

19. An apparatus for shaping plastics material pre-forms to form plastics material containers, comprising:
a conveying device which conveys containers along a pre-set conveying path;
a stressing device which acts upon the containers with a flowable medium in order to expand them;
a reservoir for storing the flowable medium; a supply line which delivers the flowable medium from the reservoir to the container;
a valve device configured to control the supply of the flowable medium into the containers, in order to expand the containers;
a first feed line configured to supply a flowable sterilization medium to the supply line between the reservoir and the container to be treated or in a removal line for the flowable medium, which removes the flowable medium from the containers, wherein the sterilization medium is conveyed in the opposite direction to the flowable medium or flowable medium and the sterilization medium are conveyed through the apparatus in the same conveying direction; and a second feed line for a further sterilization medium.

\* \* \* \* \*